July 29, 1958
F. A. KROHM
2,844,838
WINDSHIELD WIPER ARM ASSEMBLY
Filed July 1, 1954
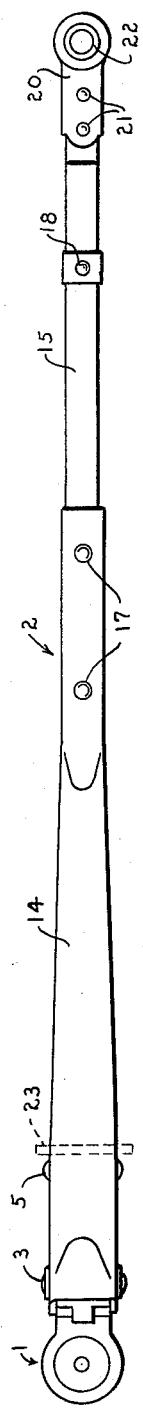
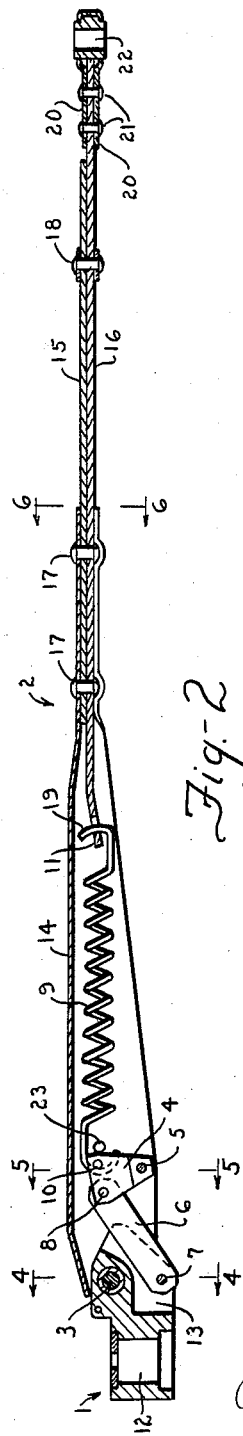
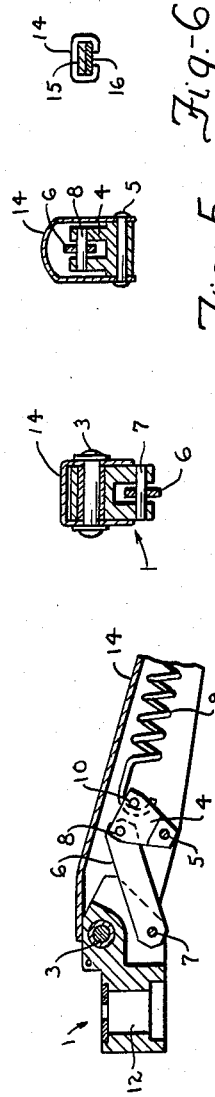
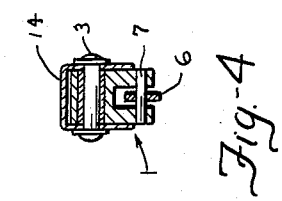
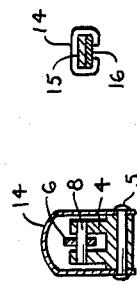
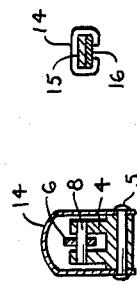
INVENTOR.
FRED A. KROHM
BY
Charles S. Penfold
ATTORNEY

United States Patent Office 2,844,838
Patented July 29, 1958

2,844,838
WINDSHIELD WIPER ARM ASSEMBLY

Fred A. Krohm, Hobart, Ind., assignor to The Anderson Company, a corporation of Indiana Application July 1, 1954, Serial No. 440,603

12 Claims. (Cl. 15—255)

This invention relates generally to a windshield wiper arm assembly and more particularly to means for controlling the action of the spring which is associated therewith for urging the arm toward the windshield.

The arm assembly, embodying the invention, is primarily suitable for use with a curved windshield but may also be used to advantage on flat windshields. The magnitude of curvature of some windshields is such that the outer blade carrying section of the arm will move inwardly and outwardly as much as six inches as the blade travels back and forth on the windshield. The arm includes an inner section which is adapted to be connected to a drive shaft, and when connected thereto and operated the angular relationship between the outer arm section and the shaft will vary considerably due to the inward and outward movement of the outer arm section. The variation in such angular relationship between the arm sections also causes a variation in the pressure exerted by the spring and as a result the blade is not urged against the windshield with a uniform pressure. This lack of uniform or constant pressure in a conventional arm is a distinct disadvantage because it reflects on the ability of the blade to properly wipe the glass.

With the foregoing in mind the principal object of the invention is to provide a wiper arm assembly with means for obtaining a substantially uniform or constant arm pressure so that the blade will properly function and produce a thorough cleaning job.

More particularly in this regard, an object of the invention is to provide an arm assembly comprising, among other things, an inner shaft attaching section, an outer blade carrying section, a rocker or movable element supported on the outer arm section, a link or connector connected to the rocker and inner section, and a pressure or force producing means such as a spring which is connected to the rocker and outer section for urging the outer section toward a windshield.

In a conventional wiper arm assembly the spring would normally be directly connected to the inner and outer sections of the arm but in the unique assembly above referred to the rocker and link are introduced and are operatively connected with one another and to the other components in such a manner that irrespective of the angular relationship between the inner and outer arm sections, the rocker and link will compensate for any variations in the tension of the spring as the blade accommodates itself to the surface of the windshield.

Another object of the invention is to provide a novel arm assembly which offers advantages with respect to manufacture and assembly and is efficient in operation.

A further object of the invention is to provide an arm assembly in which provision is made for temporarily locking the arm sections at a predetermined angle with the spring under considerable tension so as to facilitate connection of the assembly to a shaft, after which the lock is manipulated to release the sections for operation.

An important object of the invention is to provide an improved wiper arm assembly in which the components employed for obtaining a uniform pressure are substantially located within the confines of the arm.

Many other objects and advantages of the invention will become apparent after the description hereinafter set forth is considered in conjunction with the drawings annexed hereto.

In the drawings:

Figure 1 is a top view of the arm assembly embodying the invention;

Figure 2 is a longitudinal section of the arm assembly exemplifying details of its construction, including means for locking the arm sections in a predetermined angular relationship;

Figure 3 is a partial longitudinal sectional view of the arm assembly showing the operative relationship of the rocker and link when the outer section of the arm is in a position for wiping a windshield;

Figure 4 is a transverse section taken substantially on line 4—4 of Figure 2;

Figure 5 is a transverse section taken substantially on line 5—5 of Figure 2; and Figure 6 is a transverse section taken substantially on line 6—6 of Figure 2.

The arm assembly comprises an inner section 1 for attachment with a drive shaft, an outer blade carrying section 2 pivotally connected to the inner section by a pivot 3, a movable element or rocker 4 connected to the outer section by a pivot 5, a link 6 having its ends respectively pivotally connected to the inner section and rocker by pivots 7 and 8, and a helical spring 9 having its ends respectively connected to the rocker and outer arm section at 10 and 11.

The inner arm section is provided with an aperture 12 for receiving a drive shaft and a recess 13 within which the inner end of the link 6 is disposed.

The outer arm section 2 includes a tapered channel member or part 14 which is directly connected to the inner section by the pivot 3. The rocker and spring, including the outer end of the link, are substantially housed in this channel member. This outer section also includes a pair of elongated superimposed flat bar members 15 and 16 having their inner ends secured in the outer extremity of the channel 14 by a pair of rivets 17 and they are also secured together by another rivet 18. The lower bar member 16 is somewhat longer than the upper bar member and its inner end is provided with an aperture which receives a hooked end 19 of the spring. A pair of corresponding fittings 20 are secured to the opposite sides of the outer end of the lower bar member 16 by a pair of rivets 21 for holding a transversely disposed tubular bearing 22 in place. A stud on a wiper blade not shown is adapted for attachment to the bearing. Obviously, the arm may be provided with any suitable means for supporting a blade.

The rocker or movable element 4 may be constructed as desired but as herein illustrated is preferably made in the form of a generally triangular block with the pivot 5 extending through the lower corner of the block. The rocker is preferably of a thickness to nest in the channel member for guidance thereby. The upper part of the rocker is preferably bifurcated so as to receive the outer end of the link 6 and the inner hooked end of the spring which take positions in the other or upper corners of the rocker due to the pivots 8 and 10. The spring, if desired, can be attached to the rocker at some other suitable location or to the link. It is to be understood that the rocker can be supported in various ways on the arm. For example, the side walls of the channel member could be provided with inturned projections for supporting the rocker in lieu of the pivot pin shown. Also, if found desirable, a seat could be substituted for the pivot pin and projections.

The link 6 may be guided by the walls of the recess 13 provided in the inner arm section and it will be noted that the link is located for movement between the pivots 3 and 5.

As exemplified in Figure 2, a removable pin 23 extends through holes provided therefor in the side walls of the channel member 14. This pin serves as a stop or abutment for the rocker 4 to maintain the arm sections more or less in a straight condition so as to facilitate connecting the inner section to a drive shaft. This conditioning of the arm is preferably done at the factory. After the arm is attached to a shaft the pin is withdrawn to permit the spring to swing the outer section toward a windshield as illustrated in Figure 3. The use of the pin 23 or any other means suitable for the purpose is not necessary, but it does prevent the spring constituting pressure producing or biasing means from forcibly placing the arm sections in an angular relationship or positions from which it is quite difficult to straighten them out so that the inner section can be readily attached to a shaft.

By referring to Figure 3 of the drawing, it will be apparent that the spring directly influences the movement of the rocker and link to cause the outer arm section to move toward a windshield when the arm is applied to a shaft. Whenever the outer arm section moves inwardly, the rocker will move in a clockwise direction as viewed in Figure 3, and when this section moves outwardly, the rocker will move in a counterclockwise direction. More specifically in this regard, when the outer arm section carrying the blade moves outwardly the distance between the pivot 3 and the longitudinal axis of the link will shorten and have the effect of lengthening or prolonging the spring and when the section moves inwardly the aforesaid distance will lengthen and have the effect of shortening the spring. Otherwise expressed, the link will move toward the pivot 3 when the outer arm section is moved outwardly and away from the pivot 3 and toward pivot 5 when the section is moved inwardly. The rocker serves to accelerate the lengthening and shortening of the effective leverage action between the link and the inner arm section and thereby compensates for any variation in the spring tension resulting from changes in the angular relationship between the arm sections so that a substantially uniform or constant arm pressure is maintained to obtain a thorough wiping job.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

1. A windshield wiper arm assembly comprising an inner shaft engaging section and an outer blade carrying section pivotally connected to the innersection, a movable element supported on the outer section in spaced relationship to the pivotal connection between the arm sections, elongated resilient means having a outer end secured to the outer arm section and an inner end to the movable element, and a connector operatively connecting the movable element and the inner section, the arrangement being such that the angular relationship between the movable element and the connector may be varied to influence the action of the resilient means so that it will apply a substantially uniform or constant pressure to the outer arm section.

2. A windshield wiper arm assembly comprising an inner section having an exposed portion provided with an opening for receiving a drive shaft, an outer section having a channel pivotally connected to and receiving another portion of the inner section, means provided on the free end of the outer arm section for supporting a wiper blade, a movable element pivotally supported in the channel of the outer section at a location spaced from the pivotal connection between the arm sections, an elongated spring having an outer end attached to the outer arm section and an inner end to the movable element, and a connector connecting the movable element to the inner section in a manner whereby relative movement between said movable element and connector will automatically compensate for any variation of the tension of the spring resulting from any change in the angular relationship between the inner and outer arm sections.

3. A windshield wiper arm assembly comprising an inner shaft engaging section and an outer arm blade carrying section pivotally connected to the inner section, a movable element mounted on the outer arm section at a location spaced from the pivotal connection between the arm sections, an elongated connector having an inner end connected to the inner arm section and an outer end to the movable element, and pressure producing means acting on the movable element to urge the outer section in a predetermined direction, the arrangement being such that relative movement between the movable element and connector serves to compensate for any variations in the pressure produced by the pressure producing means resulting from any variations in the angular relationship between the inner and outer arm sections.

4. A windshield wiper arm assembly comprising an inner shaft attaching section and an outer blade carrying section pivotally connected to the inner section, a rocker pivotally mounted on the outer arm section, a link having a portion pivotally connected to the inner section and a portion pivotally connected to the rocker, and a helical spring having one end connected to the outer arm section and its other end connected to the rocker for urging the outer section in a predetermined direction.

5. A windshield wiper arm assembly comprising an inner shaft engaging section and an outer blade carrying section pivotally connected to the inner section, a rocker pivotally mounted on the outer arm section, a recess provided in the inner arm section and a bifurcation provided in the rocker, an elongated link having one end pivotally mounted in the recess and its other end pivotally mounted in the bifurcation, and an elongated tension spring having one end attached to the outer arm section and its other end being secured in the bifurcation.

6. A windshield wiper arm assembly comprising an inner shaft engaging section and an outer blade carrying section pivotally connected to the inner section, a rocker member pivotally mounted on the outer arm section, a recess provided in the inner arm section and a bifurcation provided in the rocker member, an elongated link member having one end pivotally mounted in the recess and its other end pivotally mounted in the bifurcation, biasing means operatively connecting the outer arm section with one of said members, and means for temporarily locking the rocker member in a position whereby to maintain the inner and outer arm sections in a substantially straight condition.

7. A windshield wiper arm assembly comprising an inner shaft attaching section and an outer blade carrying section pivotally connected to the inner section, a spring, means operatively connecting the spring to the outer section and the inner section for urging the outer section in a predetermined direction, and means for temporarily locking the operatively connecting means so that the spring is rendered inoperative to influence the operation of the inner section.

8. A windshield wiper arm assembly comprising an inner shaft attaching section and an outer wiper blade carrying section pivotally connected to the inner section, a rocker pivotally mounted on the outer section, a link operatively connecting the inner section and the rocker, a spring secured to the outer arm section and to the rocker, and a means carried by the outer arm section for rendering the spring inoperative until the arm is applied to a drive shaft.

9. A windshield wiper arm comprising an inner section and an outer blade carrying channel section pivotally connected to the inner section, a device comprising a movable member supported on the outer section at a location spaced from the pivotal connection between the arm sections and a member operatively connecting the inner section and the movable member, and tension means connected to the device and to said outer section, said device and said tension means being disposed substantially within the confines of said outer section.

10. A windshield wiper arm comprising an inner section and an outer blade carrying assembly pivotally connected to the inner section, a device comprising a pair of members pivotally connected together and respectively pivotally connected to the inner section and outer assembly at fixed locations, and biasing means carried by the outer assembly and operatively connected to the device.

11. A windshield wiper arm comprising an inner section and an outer blade carrying assembly pivotally connected to the inner section, a rocker member mounted on the assembly for movement about an axis disposed substantially transverse to the longitudinal axis of the arm, a member operatively connecting the rocker member and the inner section, and resilient means operatively connecting the outer assembly and one of said members.

12. The structure defined in claim 4, in which the points of connection between the link, spring and rocker are closely associated and located at one side of a line passing through the pivotal connections between the sections and the outer section and rocker, and the pivotal connection between the inner section and link is located on the opposite side of said line.

References Cited in the file of this patent
UNITED STATES PATENTS

| | | |
|---|---|---|
| 1,911,155 | Hueber | May 23, 1933 |
| 2,557,755 | Nesson | June 19, 1951 |
| 2,736,053 | Oishei et al. | Feb. 28, 1956 |